United States Patent
Cadera et al.

(10) Patent No.: US 6,451,201 B1
(45) Date of Patent: Sep. 17, 2002

(54) DISTRIBUTED ON-LINE INTEGRITY TESTING FOR IMMERSED MEMBRANES

(75) Inventors: Jason Cadera, Guelph (CA); Nicholas Adams, Hamilton (CA)

(73) Assignee: Zenon Environmental Inc., Oakville (CA)

( * ) Notice: Subject to any disclaimer, the term of this patent is extended or adjusted under 35 U.S.C. 154(b) by 0 days.

(21) Appl. No.: 09/840,918

(22) Filed: Apr. 25, 2001

(51) Int. Cl.⁷ .............................................. B01D 65/10

(52) U.S. Cl. ............................ 210/85; 210/87; 210/97; 210/323.1; 210/321.6; 73/38; 73/40; 73/863.03; 73/863.23; 73/863.31; 73/863.83

(58) Field of Search ........................ 73/863.23, 863.02, 73/863.03, 863.31, 863.33, 863.83, 40, 38; 96/413; 210/85, 97, 87, 137, 253, 321.6, 340, 323.1

(56) References Cited

U.S. PATENT DOCUMENTS 5,488,811 A    2/1996   Wang et al.

FOREIGN PATENT DOCUMENTS

JP    08-252440 A   * 10/1996

OTHER PUBLICATIONS

Mar. 1995—"Journal AWWA", Low Pressure Membranes: Assesing Integrity–pp. 62–75.

"Minneapolis Institute of Arts", MEDUSA—On–line, multi–point membrane filtration monitoring system—Process and Turbidity Business Unit Hach Company –pp. 1–9, not dated.

"Monitoring the Integrity of Capillary Membranes by Particle Counters", *Desalination*, vol. 119, p. 65–72 (1998).

* cited by examiner

*Primary Examiner*—Joseph W. Drodge
*Assistant Examiner*—Terry K. Cecil
(74) *Attorney, Agent, or Firm*—Bereskin & Parr

(57) ABSTRACT

In an apparatus for providing a continuous integrity test for suction driven filtering membrane assemblies 10, a monitoring line 32 diverts a portion of permeate to a monitoring device 30 (e.g. a turbidimeter). Both ends 34, 36 of the monitoring line are connected to the permeate pipe 20 upstream from the permeate pump 26 and at points of relatively higher and lower pressures respectively, to cause fluid to flow through the monitoring line. The relatively higher and lower pressures may be caused by a source of head loss 38 (e.g. a valve) in the permeate line. The source of head loss may be adjusted to provide a required flow through the monitoring device by a control 43 communicating with a flow meter 42 in the monitoring line. Membrane assemblies may be individually monitored although many of them may be connected to a common permeate pump (FIG. 2).

9 Claims, 3 Drawing Sheets

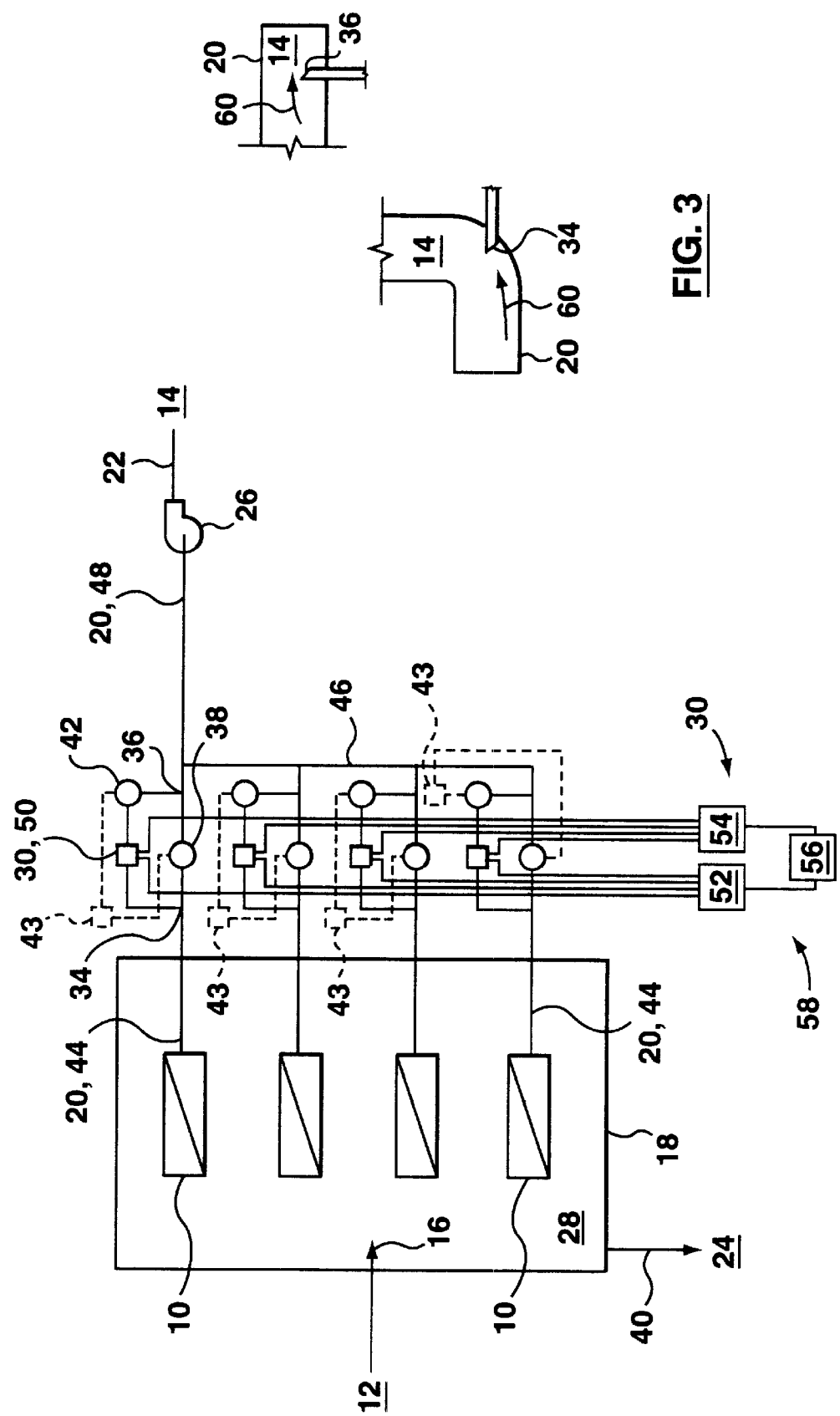

DISTRIBUTED ON-LINE INTEGRITY TESTING FOR IMMERSED MEMBRANES

FIELD OF THE INVENTION

This invention relates to integrity testing for filtering membranes, particularly for suction driven microfiltration or ultrafiltration membranes.

BACKGROUND OF THE INVENTION

One advantage of using membranes to filter water is that membranes are able to remove very small particles including pathogenic microorganisms and colloids. Thus, strong chemicals may not be required as a primary disinfectant in drinking water applications and a nearly complete lack of colloids in water improves the performance of many industrial processes.

To ensure that undesired particles are removed, the integrity of a membrane unit must be tested. This is often done by air leak tests (pressure hold tests and pressure decay tests) performed while permeation is temporarily stopped. Although effective, each test interrupts permeation and lowers the yield of the process. Accordingly, discontinuous testing is typically performed at most every 4 hours and a leak could go un-noticed for up to that long. Thus, at least the California Department of Health has indicated that it requires continuous integrity testing before chlorination requirements can be further reduced for membrane filtration plants.

The dominant continuous integrity testing techniques involve in-line instruments such particle counters, particle monitors or turbidity meters. These instruments do not evaluate the membrane itself but instead monitor and assess a surrogate parameter to diagnose the membrane condition. For instance, a particle counter generally includes a light scattering sensor, typically laser-based, interfaced with a computer running particle enumeration software that assesses the number of particles in one or more particle size ranges: see generally Panglish et al., "Monitoring the Integrity of Capillary Membranes by Particle Counters", *Desalination,* vol. 119, p. 65–72 (1998). Similarly, a particle monitor that measures the fluctuation in intensity in a narrow light beam transmitted through a permeate sample is also known. Through subsequent computer analysis, the observed fluctuations can be converted into an index of water quality.

Such in-line testing equipment is elaborate and expensive. Unfortunately, the number of membrane units or modules that can be simultaneously monitored using a single equipment set-up is limited by dilution effects. For example, a defect such as a broken fibre in a large (ie. >1 MGD) plant could cause a health concern but may not be detected by in-line testing equipment sampling the plant outlet.

One solution that has been proposed for pressure driven membranes is the MEDUSA™ system by Hach Company. In the MEDUSA™ system, a monitoring line is tapped into the permeate collector of each of several small membrane assemblies upstream of where those permeate collectors join the main permeate outlet pipe. A portion of the pressurized permeate flows through the monitoring line which passes through a turbidimeter body and then to a drain. Each of the turbidimeter bodies is connected to a central laser multiplexer and a detector multiplexer which are in turn connected to control electronics. Thus, each of a plurality of small pressure driven membrane assemblies are monitored individually.

SUMMARY OF THE INVENTION

An object of the present invention is to provide a method and/or apparatus for providing a continuous integrity test for filtering membranes, particularly suction driven microfiltration or ultrafiltration membranes. The inventors have observed that with suction driven membranes, pressurized permeate as required by the prior art is only available downstream of the permeate pump. Economical large plant design, however, requires a single permeate pump for several distinct membrane assemblies. The dilution effect discussed above prevents in-line testing equipment from detecting a leak in a fibre by sampling permeate downstream of the permeate pump in a large plant.

In one aspect of the present invention, a monitoring line carries permeate from a membrane assembly through an in-line monitoring device. The membrane assembly is small enough, in view of the dilution effect, to be adequately tested by the in-line monitoring device. Both ends of the monitoring line are connected to an assembly permeate pipe of the membrane assembly. To produce a flow of permeate through the monitoring line, its inlet and outlet are placed at points of relatively higher and lower pressures respectively. Preferably, each end of the monitoring line is placed on the opposite sides of a pressure drop in the assembly permeate pipe. The pressure drop is greater than the pressure drop through the in-line monitoring device and the monitoring line. The pressure drop can be created by existing components, such as a series of bends in the piping or an existing valve, or from an added component such as an orifice plate or an additional valve.

By using a pressure drop in a permeate pipe to generate a flow of permeate for the in-line monitoring device, permeate can be monitored in a suction-driven system before it is pressurised by the permeate pump. This allows membrane assemblies to be individually monitored by connecting monitoring lines to assembly permeate pipes associated with each of a plurality of membrane assemblies even though one permeate pump services all of them, for example through a header.

BRIEF DESCRIPTION OF THE DRAWINGS

Embodiments of the invention will be described below with reference to the following drawings:

FIG. 2 is a schematic representation of an integrity testing apparatus for a plurality of assemblies of immersed, suction-driven, outside-in flow membranes with certain components shown in plan view.

FIG. 3 illustrates a portion of an integrity testing apparatus including an inlet and outlet of a monitoring line.

DETAILED DESCRIPTION OF THE INVENTION

Figure 1:
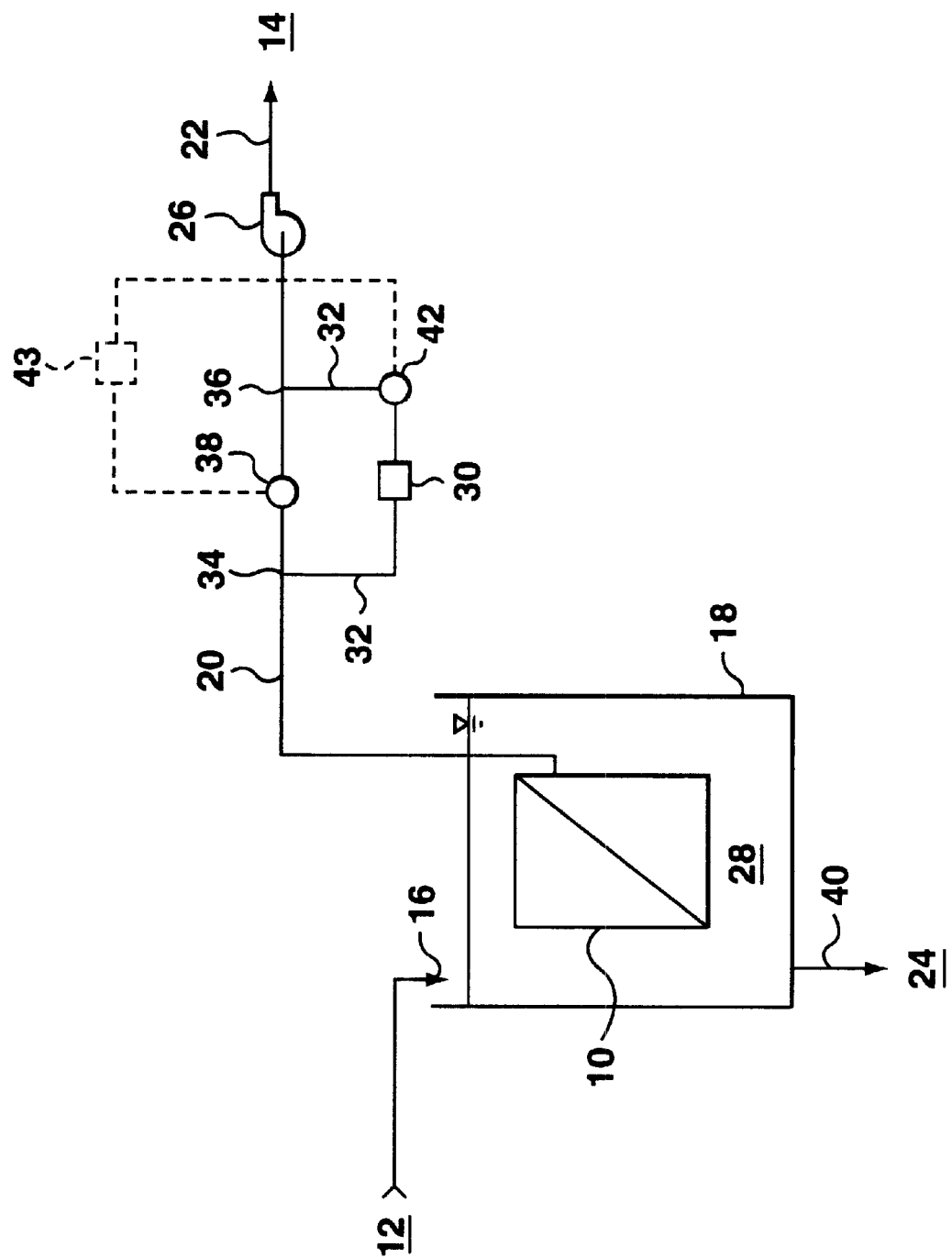
FIG. 1 is a schematic representation of an integrity testing apparatus for an assembly of immersed, suction-driven, outside-in flow membranes with certain components shown in elevation view.

Referring to FIG. 1, a membrane assembly 10 is provided in a tank 18 which is open to the atmosphere. The inventors prefer hollow-fibre filtering membranes, which may be made of polypropylene, polysulfone derivatives or the like, for the membrane assembly 10 although other types of suction driven membrane assemblies 10 may be used. Feed water 12 is applied to the outside of the membranes in the membrane assembly 10 and permeate 14 is collected from the insides of the membranes.

The membrane assembly 10 is connected by a permeate pipe 20 to a permeate pump 26. Feed water 12 enters the tank 18 through an feed inlet 16 typically through various valves etc. as is known in the art. Permeate 14 is produced at a permeate outlet 22 by operating the permeate pump 26 to apply a suction to the insides of the membranes of the membrane assembly 10. Retentate 24 also leaves the tank 12, for example by overflow or through a drain 40, periodically or continuously and typically through various valves etc. as is known in the art. Feed water 12 flows into the tank 18 to replace permeate 14 and retentate 24 drawn out of the tank 18 such that the membrane assembly 10 remains immersed in feed/retentate 28 during permeation. Typically, means for backwashing and aerating the membranes are also provided as is known in the art.

To facilitate continuous integrity testing, an in-line or flow through monitoring device 30 is connected to a monitoring line 32. The monitoring device 30 may be a particle counter, particle monitor, turbidity meter or any other device suitable for assessing the integrity of the membrane assembly 10 by analyzing a flow of permeate 14. To provide flow through the monitoring line 32, a monitoring line inlet 34 and a monitoring line outlet 36 are connected to the permeate pipe 20 upstream of the permeate pump 26 at points of relatively higher and lower pressures respectively. Preferably, points of relatively higher and lower pressure in the permeate pipe 20 are created by a source of a head loss 38 in the permeate pipe 20 upstream of the permeate pump 26. Alternatively, points of relatively higher and lower pressure in the permeate pipe 20 can be created by other means such as modifying the diameter of the permeate pipe 20 in places. For example, a section of large diameter permeate pipe 20 can create a relatively high pressure and a venturi or section of small diameter permeate pipe 20 can create an area of relatively low pressure. The difference in pressure between the points of relatively higher and lower pressure is greater than the pressure drop through the monitoring device 30 and monitoring line 32.

To create points of relatively higher and lower pressure in the permeate pipe 20 by means of a head loss, the source of a head loss 38 can be various devices such as a series of preferably pre-existing bends in the permeate pipe 20, a valve or a fixed or variable size orifice. Preferably, the source of a head loss 38 is a valve, bend or other element of a permeate pipe 20 required for reasons other than creating a head loss to provide flow through the monitoring device 30. A flow meter 42, typically a rotameter, is preferably also provided in the monitoring line 32.

Since the head loss produced by the source of a head loss 38 will vary with the flow of permeate 14, the source of a head loss 38 is chosen to produce an acceptable range of flows in the monitoring line 32 for the range of anticipated permeate 14 flows. If the monitoring device 30 requires a narrower range of flows than a fixed source of a head loss 38 can provide, then an adjustable source of a head loss 38, such as a valve or variable size orifice, may be used. With an adjustable source of a head loss 38, information from the flow meter 42 can be used to adjust the size of the pressure drop to provide a desired flow through the monitoring device 30. The adjustment may be made manually or automatically by connecting the flow meter 42 to a control 43 for the source of a head loss 38. For example, the flow meter 42 may provide a signal to a PLC which operates a servo motor which opens or closes a valve acting as a source of a head loss 38.

Referring now to FIG. 2, a plurality of membrane assemblies 10 are provided in a tank 18 which is shown in plan view. Elements numbered as in FIG. 1 are similar in FIG. 2. In FIG. 2, however, each membrane assembly 10 has an assembly permeate pipe 44 which carries permeate from that membrane assembly 10 only. A header 46 connects the assembly permeate pipes 44 into a permeate collector pipe 48 upstream of the permeate pump 26. Thus a single permeate pump 26 services a plurality of membrane assemblies 10.

A monitoring device 30 and monitoring line 32 are provided for each assembly permeate pipe 44. The monitoring line inlets 34 are connected to the appropriate assembly permeate pipe 44. The monitoring line outlets 36 may be connected to the permeate collector pipe 48 but are preferably connected to the appropriate assembly permeate pipe 44. As for FIG. 1, the monitoring line inlets 34 and monitoring line outlets 36 are connected to points of relatively higher and lower pressures respectively. Points of relatively higher and lower pressure are preferably created by a source of a head loss 38 which is preferably located in the assembly permeate pipes 44. However, the source of a head loss 38 may be located in the permeate collector pipe 48, or in both the assembly permeate pipes 44 and the permeate collector pipes 48 and the connections between them, if the monitoring line outlets 36 are also located in the permeate collector pipe 48 (downstream of the head loss 38). Alternatively or additionally, points of relatively higher and lower pressure can be created by other means such as providing appropriate diameters of sections of the assembly permeate pipes 44 or permeate collector pipes 48 where the monitoring line inlets 34 and/or monitoring line outlets 36 are connected. In particular, where the monitoring line outlets 36 are connected to the permeate collector pipe 48, the choice of diameters for the permeate collector pipe 48 and the assembly permeate pipes 44 can produce a differential in pressure between the monitoring line inlets 34 and the monitoring line outlets 36 which alone, or in conjunction with the header 46 and the connections to and from the header 46 acting as a source of a head loss 38, may be sufficient to provide the required flow.

Although separate monitoring devices 30 may be used for each membrane assembly 10, it is preferred if the monitoring device 30 is a distributed device such as the MEDUSA™ system described further above. In that system, the monitoring device 30 comprises a plurality of turbidimeter bodies 50 connected to a shared processing unit 58 comprising a laser multiplexer 52, a detector multiplexer 54 and control electronics 56. A turbidimeter body 50 is placed in each monitoring line 32.

Referring to FIG. 3, a preferred monitoring line inlet 34 has an opening facing into the direction of flow of permeate 60 and a preferred outlet 36 has an opening facing along the direction of flow of permeate 60. In combination or optionally, other aspects of the location, orientation and shaping of the inlet 34 and outlet 36, for example to take advantage of local pressure and velocity variations in the permeate pipes 20, can be used if necessary to increase flow through the monitoring line 32. This is particularly useful when using bends, valves or other elements of permeate pipe 20, which exist for reasons other than creating a head loss, to provide flow through a monitoring device 30.

EXAMPLE

Figure 4:
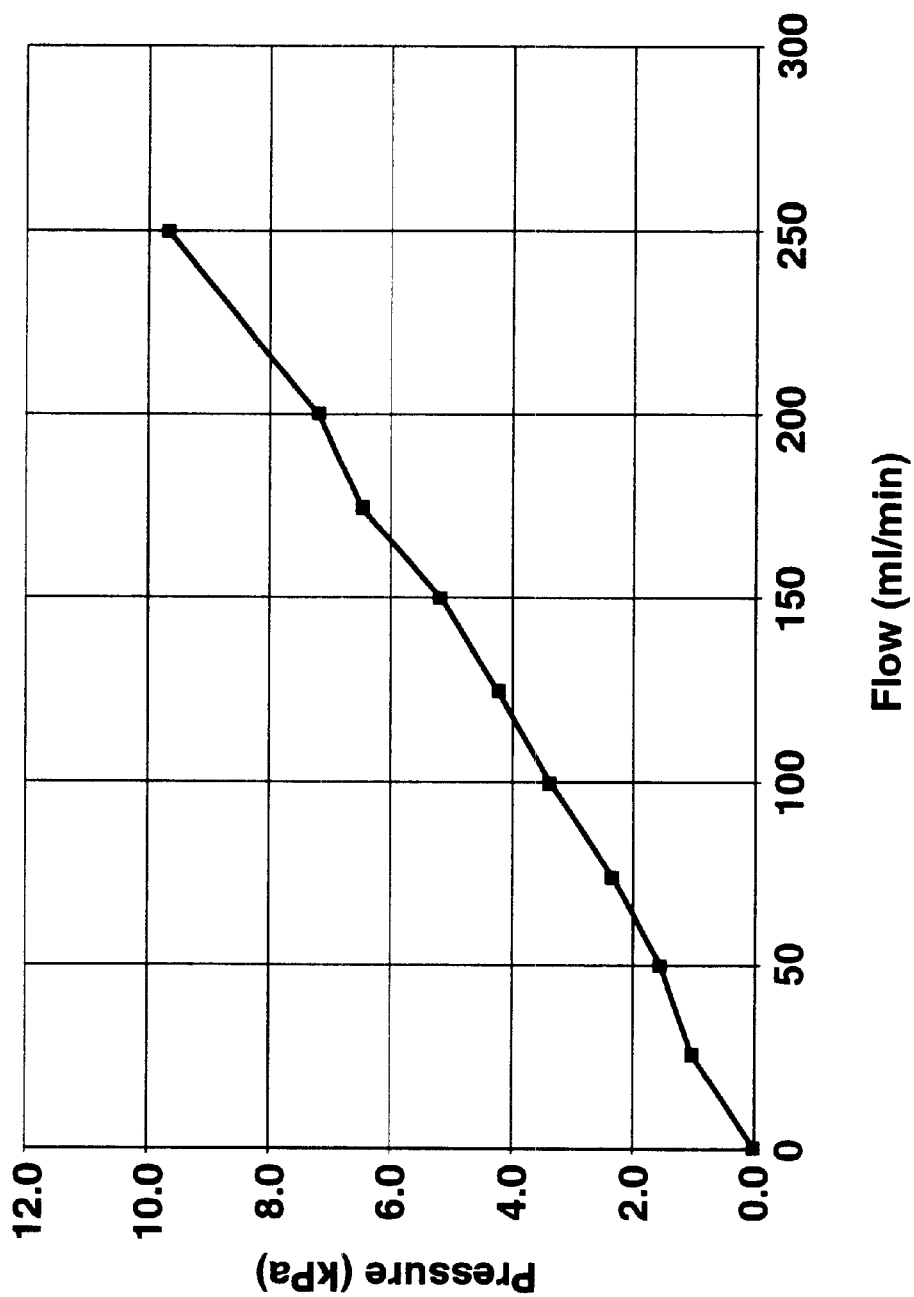
FIG. 4 is a graph showing the relationship between pressure drop and flow through an experimental embodiment of the invention.

A pilot-scale reactor was constructed according to FIG. 1 with a hand valve for a source of a head loss. A 2 inch diameter permeate pipe serviced a small assembly of membranes. Suction on the membranes varied between 5 and 8 psi and permeate flow through the permeate pipe was about 10 gpm. The monitoring device was a Hach MEDUSA™ turbidimeter body and the monitoring line was 10 feet of ¼ inch outside diameter tubing. The hand valve was adjusted to produce a range of head losses. Flow through the monitoring line was measured at each head loss. As shown in FIG. 4, the minimum required flow was achieved with a head loss of about 1 kPa and any flow in the required range of 25–200 mL/min could be achieved as the flow was roughly proportional to head loss.

While preferred embodiments of the present invention have been described, the embodiments disclosed are illustrative and not restrictive. The invention is defined by the following claims.

We claim:

1. An apparatus for testing the integrity of a suction-driven filtering membrane assembly, comprising:
   (a) a permeate pipe connected between the membrane assembly and a permeate pump, for carrying a main flow of permeate produced through the membrane assembly while the permeate pump is operating;
   (b) a monitoring line having an inlet and an outlet connected to the permeate pipe upstream of the permeate pump, for carrying a flow of permeate diverted from the main flow of permeate; and,
   (c) a monitoring device connected to the monitoring line for analyzing the permeate flowing through the monitoring line so as to assess the integrity of the membrane assembly,
   wherein
   (d) the membrane assembly is small enough, in view of the dilution effects, to be adequately tested by the monitoring device;
   (e) the monitoring line inlet and the monitoring line outlet are connected to the permeate pipe upstream of the permeate pump at points which will have relatively higher and lower pressures respectively when the permeate pump is operating, to provide flow through the monitoring line; and,
   (f) when the permeate pump is operating, the difference in pressure between the relatively higher and lower pressures is sufficient to generate a required flow through the monitoring device.

2. The apparatus of claim 1 wherein difference in pressure between the relatively higher and lower pressures is created substantially by a source of a head loss in the permeate pipe between the monitoring line inlet and the monitoring line outlet.

3. The apparatus of claim 2 wherein the source of a head loss is a valve, bend or other element of the permeate pipe required for reasons other than creating a head loss to provide flow through the monitoring device.

4. The apparatus of claim 2 wherein
   (a) the source of a head loss is adjustable,
   and further comprising
   (b) a flow meter in the monitoring line; and,
   (c) a control for the source of a head loss in communication with the flow meter,
   further wherein,
   (d) the control is operable to adjust the source of a head loss in response to changes in flow through the monitoring line caused by changes in the flow of permeate, to provide the required flow through the monitoring device.

5. An apparatus for testing the integrity of a plurality of suction-driven filtering membrane assemblies, comprising:
   (a) a plurality of membrane assemblies;
   (b) a permeate pump;
   (c) a permeate pipe network comprising:
      (i) a plurality of assembly permeate pipes each connected to a membrane assembly for carrying a main flow of permeate produced through the connected membrane assembly while the permeate pump is operating; and,
      (ii) a header connected to the assembly permeate pipes; and,
      (iii) a permeate collector pipe connecting the header to the permeate pump,
   (d) a plurality of monitoring lines, each associated with a membrane assembly, for carrying a portion of flow of permeate diverted from the main flow of permeate from the associated membrane assembly, and each having and inlet and an outlet, the inlet connected to the assembly permeate pipe of the associated membrane assembly; and,
   (e) one or more monitoring devices connected to the monitoring lines for analyzing the permeate flowing through the monitoring lines so as to assess the integrity of each membrane assembly,
   wherein
   (f) membrane assemblies are small enough, in view of the dilution effects, to be adequately tested by their associated monitoring device;
   (g) the outlet of each monitoring line is connected to the permeate pipe network upstream of the permeate pump at a point which will have relatively lower pressure than at the inlet to that monitoring line when the permeate pump is operating, to provide flow through the monitoring line; and,
   (h) when the permeate pump is operating, the difference in pressure between the inlet and outlet of each monitoring line is greater than the pressure drop through the associated monitoring device and monitoring line.

6. The apparatus of claim 5 wherein difference in pressure between the inlets and the outlets of the monitoring lines is created substantially by one or more sources of a head loss in the permeate pipe network between the monitoring line inlets and the monitoring line outlets.

7. The apparatus of claim 6 wherein the one or more sources of a head loss are valves, bends or other elements of the permeate pipe network required for reasons other than creating a head loss to provide flow through the monitoring devices.

8. The apparatus of claim 6 wherein the one or more monitoring devices comprises a plurality of sensors, one connected to each monitoring line and to a processing unit.

9. The apparatus of claim 6 wherein
   (a) the sources of a head loss are adjustable,
   and further comprising
   (b) flow meters in the monitoring lines; and,
   (c) controls for the sources of a head loss in communication with the flow meters,
   further wherein,
   (d) the controls are operable to adjust the sources of a head loss in response to changes in flow through the monitoring lines caused by changes in the flow of permeate, to provide the required flow through the monitoring devices.

* * * * *

UNITED STATES PATENT AND TRADEMARK OFFICE
CERTIFICATE OF CORRECTION

PATENT NO.   : 6,451,201 B1
DATED        : September 17, 2002
INVENTOR(S)  : Jason Cadera and Nicholas Adams It is certified that error appears in the above-identified patent and that said Letters Patent is hereby corrected as shown below:

Column 6,
Line 17, delete "and" (first occurrence) and substitute -- an --.

Signed and Sealed this

Eighteenth Day of March, 2003

JAMES E. ROGAN
*Director of the United States Patent and Trademark Office*